US006374273B1

(12) United States Patent
Webster

(10) Patent No.: US 6,374,273 B1
(45) Date of Patent: *Apr. 16, 2002

(54) REFORMATTING A FIRST SINGLE-COLUMN MARKUP DOCUMENT INTO A MULTI-COLUMN DOCUMENT, AND FORMATTING SECOND MARKUP DOCUMENT IN THE BACKGROUND, WHILE DISPLAYING THE FIRST REFORMATTED DOCUMENT

(75) Inventor: Roger Robert Webster, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,345

(22) Filed: Jun. 5, 1998

(51) Int. Cl.[7] .............................................. G06F 7/00
(52) U.S. Cl. .................... 707/513; 707/501.1; 707/517
(58) Field of Search ................................ 707/501, 513, 707/517, 526

(56) References Cited

U.S. PATENT DOCUMENTS 5,089,990 A * 2/1992 Saito ........................... 707/530
5,127,003 A   6/1992 Doll, Jr. et al. ............. 370/259

(List continued on next page.)

FOREIGN PATENT DOCUMENTS

JP       406075948 A       3/1994

WO       WO99/35592        7/1999

OTHER PUBLICATIONS

Wordperfect 6.1 screendumps, formatting columns, Apr. 15, 1996.*
HTML JAVA CGI VRML SGML Web Publishing Unleashed, Sams.net Pub., pp. 268–281, 283–286, and 548–551, 1996.*
Adjustable Multi–Column Listbox, IBM TBD, vol.37, Iss.#2B, pp.475–480, Feb. 1, 1994.
"Microsoft Windows 3.1 Step–by–Step," Microsoft Press, 1992 (4 pages).
Cotter, S. et al., "Inside Taligent Technology,"1995, pp. 74–109, 172–212.
*Desktop Frameworks Concepts*, Chapter 6, "Presentation and Compound Document Framework Concepts," Taligent, Inc., 1995, pp. 117–125, 128–151.
*Desktop Frameworks Concepts*, Chapters 1&2, "Basic Document Framework Concepts" and "Input System", 1995, pp. 1–21, 22–41.

(List continued on next page.)

*Primary Examiner*—Stephen S. Hong
*Assistant Examiner*—Cesar B. Paula
(74) *Attorney, Agent, or Firm*—Gates & Cooper LLP

(57) ABSTRACT

An optimized HTML (HyperText Markup Language) viewer formats documents and other information into a convenient, newspaper-like, multi-column format. The viewer can display one or many documents simultaneously, wherein a new document can be appended to the end of a currently displayed document. A multiple-column document can be scrolled by whole columns, images in documents are scaled as necessary, and tables are intelligently broken across multiple columns at row boundaries.

30 Claims, 8 Drawing Sheets

U.S. PATENT DOCUMENTS

| | | | | |
|---|---|---|---|---|
| 5,297,249 A | | 3/1994 | Bernstein et al. | 345/356 |
| 5,301,315 A | | 4/1994 | Pellicano | 707/4 |
| 5,446,842 A | | 8/1995 | Schaeffer et al. | 709/205 |
| 5,481,666 A | | 1/1996 | Nguyen et al. | 345/357 |
| 5,500,929 A | | 3/1996 | Dickinson | 345/356 |
| 5,522,066 A | | 5/1996 | Lu | 707/1 |
| 5,537,618 A | | 7/1996 | Boulton et al. | 345/326 |
| 5,544,302 A | | 8/1996 | Nguyen | 345/326 |
| 5,566,291 A | | 10/1996 | Boulton et al. | 345/326 |
| 5,572,643 A | | 11/1996 | Judson | 709/218 |
| 5,623,590 A | | 4/1997 | Becker et al. | 345/326 |
| 5,632,022 A | | 5/1997 | Warren et al. | 345/350 |
| 5,633,996 A | * | 5/1997 | Hayashi et al. | 707/513 |
| 5,634,064 A | * | 5/1997 | Warnock et al. | 707/513 |
| 5,636,350 A | | 6/1997 | Eick et al. | 345/440 |
| 5,649,216 A | * | 7/1997 | Sieber | 707/506 |
| 5,675,788 A | | 10/1997 | Husick | 707/104 |
| 5,701,500 A | * | 12/1997 | Ikeo et al. | 707/517 |
| 5,721,906 A | | 2/1998 | Siefert | 707/9 |
| 5,845,299 A | * | 12/1998 | Arora et al. | 707/513 |
| 5,893,127 A | * | 4/1999 | Tyan et al. | 707/513 |
| 5,956,738 A | * | 9/1999 | Shirakawa | 707/517 |
| 5,983,227 A | * | 11/1999 | Nazem et al. | 707/10 |
| 5,987,454 A | * | 11/1999 | Hobbs | 707/4 |
| 6,023,714 A | * | 2/2000 | Hill et al. | 707/513 |
| 6,061,697 A | * | 5/2000 | Nakao | 707/513 |
| 6,061,700 A | * | 5/2000 | Brobst et al. | 707/517 |
| 6,094,684 A | * | 7/2000 | Pallman | 709/227 |
| 6,232,967 B1 | * | 5/2001 | Kelley et al. | 345/333 |
| 2001/0011364 A1 | | 8/2001 | Stoub | 717/1 |

OTHER PUBLICATIONS

"CommonPoint Application System—Human Interface Guidelines," Chapters1–4, Taligent, Inc., 1995, pp. 1–79.

Freeland, P. et al., "Lotus Notes 3.0/3.1 for Dummies," IDG Books Worldwide, Inc., San Mateo, California, 1994, pp. 27–34.

* cited by examiner

REFORMATTING A FIRST SINGLE-COLUMN MARKUP DOCUMENT INTO A MULTI-COLUMN DOCUMENT, AND FORMATTING SECOND MARKUP DOCUMENT IN THE BACKGROUND, WHILE DISPLAYING THE FIRST REFORMATTED DOCUMENT

BACKGROUND OF THE INVENTION

1. Field of the Invention

This invention relates in general to web browsers, and in particular, to an optimized HyperText Markup Language (HTML) viewer for displaying information in a convenient, newspaper-like, multi-column format.

2. Description of Related Art

Traditionally, HTML viewers manifest themselves as Internet browsers. As such, they generally enforce a "one size fits all" philosophy for viewing data on the Internet. Some data, particularly long documents or a series of documents, are often more appropriately viewed in a format similar to that of a newspaper or magazine. The reason for this is that the human eye can follow text in narrow columns more easily than wide columns.

In current browsers, documents are formatted according to the width of the browser window, and continue on for some arbitrary vertical length. (This is referred to as the "toilet-paper" model of text formatting, because the logical "paper" onto which the text is formatted can be thought of as a roll of paper, rather than sheets of paper).

It can be seen, then, that there is a need in the art for an improved HTML viewer that presents HTML documents (or plain text documents) in a multi-column format.

SUMMARY OF THE INVENTION

To overcome the limitations in the prior art described above, and to overcome other limitations that will become apparent upon reading and understanding the present specification, the present invention discloses an optimized HTML viewer that displays documents and other information in a convenient, newspaper-like, multi-column format. The optimized HTML viewer also supports viewing one or many documents simultaneously, wherein the user has the option to append a new document to the end of a currently displayed document. Moreover, the viewer scrolls by whole columns. Finally, images in documents are scaled as necessary and tables are intelligently broken across multiple columns at row boundaries.

An object of the present invention is to provide more flexibility and user control in HTML viewers and thus eliminate the "one size fits all" philosophy for viewing data on the Internet. Another object is to provide a HTML viewer that is more appropriate for viewing long documents or a series of documents on the Internet.

BRIEF DESCRIPTION OF THE DRAWINGS

Referring now to the drawings in which like reference numbers represent corresponding parts throughout:

FIGS. 2A–2F illustrate examples of information displayed on a monitor by the optimized viewer of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The HTML viewer of the present invention is optimized for viewing and printing large amounts of information (textual and graphical) in a convenient, newspaper-like, multi-column format. One or many documents may be viewed simultaneously, wherein the user has the option to append the new document to the end of the currently displayed document. The optimized viewer scrolls by columns, scales images in documents as necessary to fit within the columns, and intelligently breaks tables across multiple columns at row boundaries.

Hardware Environment

Figure 1:
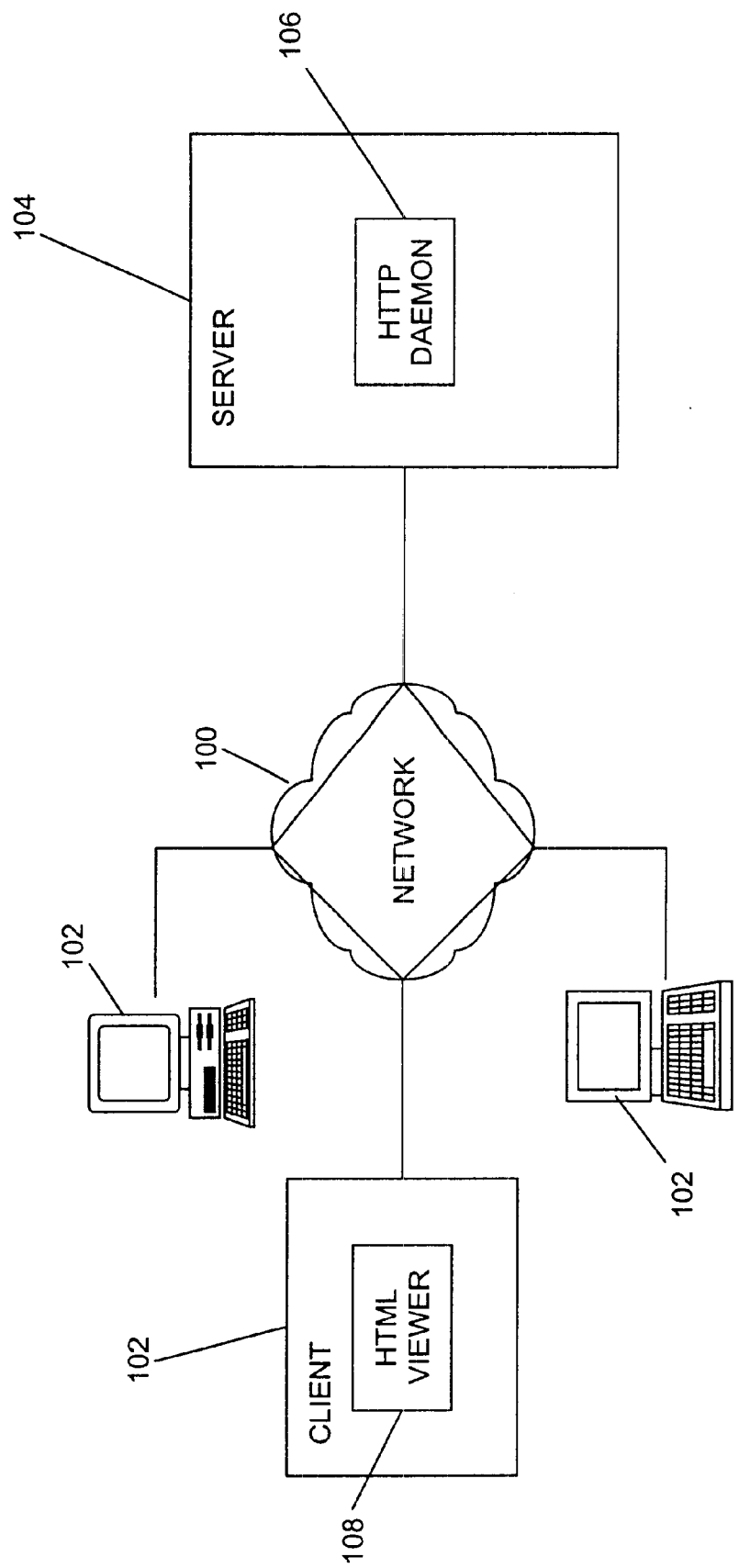
FIG. 1 is a block diagram of an exemplary hardware environment of the preferred embodiment of the present invention.

FIG. 1 is a block diagram of an exemplary hardware environment of the preferred embodiment of the present invention, wherein a network 100 connects client computers 102 to server computers 104. The network 100 preferably comprises the Internet, an Intranet, or an Extranet, although it could also comprise a LAN, WAN, SNA network, etc. The client computers 102 are usually personal computers or workstations, and the server computers 104 are usually personal computers, workstations, minicomputers, and/or mainframes. Each of the computers generally include, inter alia, a processor, random access memory (RAM), data storage devices, data communications devices, monitor, user input devices, etc.

In the preferred embodiment, the server computers 104 execute a web or HTTP (HyperText Transport Protocol) daemon 108 or other program that transmits information to the client computers 102. In turn, the client computers 102 execute an optimized HTML (HyperText Markup Language) viewer 108 according to the present invention. The optimized HTML viewer 108 is, in essence, an optimized web browser, and thus the functionality described herein could be incorporated into programs such as IBM's Web Explorer™, Netscape's Navigator™ or Communicator™, Microsoft's Internet Explorer™, or other computer programs.

The optimized viewer 108, and the other programs described above, are comprised of instructions which, when read and executed by a computer, causes the computer to perform the steps necessary to implement and/or use the present invention. Generally, the optimized viewer 108 is tangibly embodied in and/or readable from a device, carrier, or media, such as a memory, data storage device, and/or a remote device connected to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of the Optimized Viewer

Figure 2A:
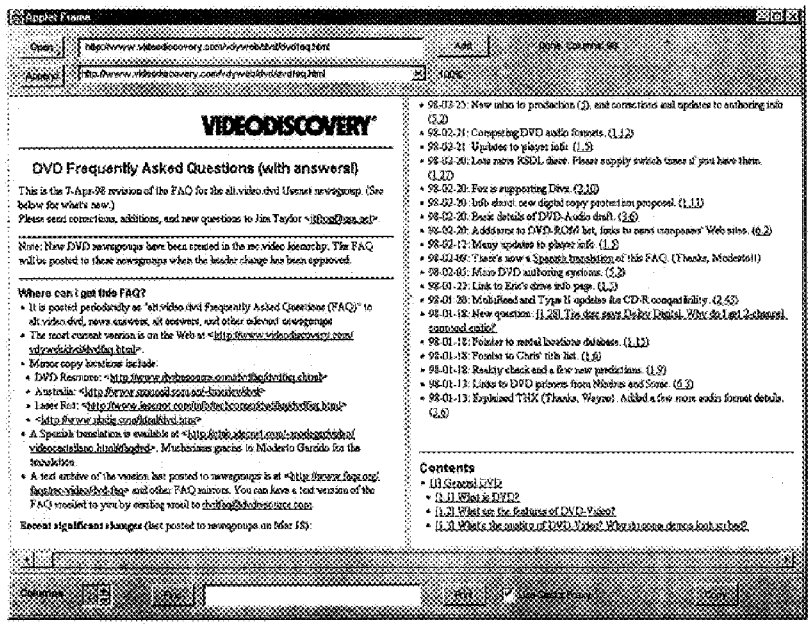
Figure 29:
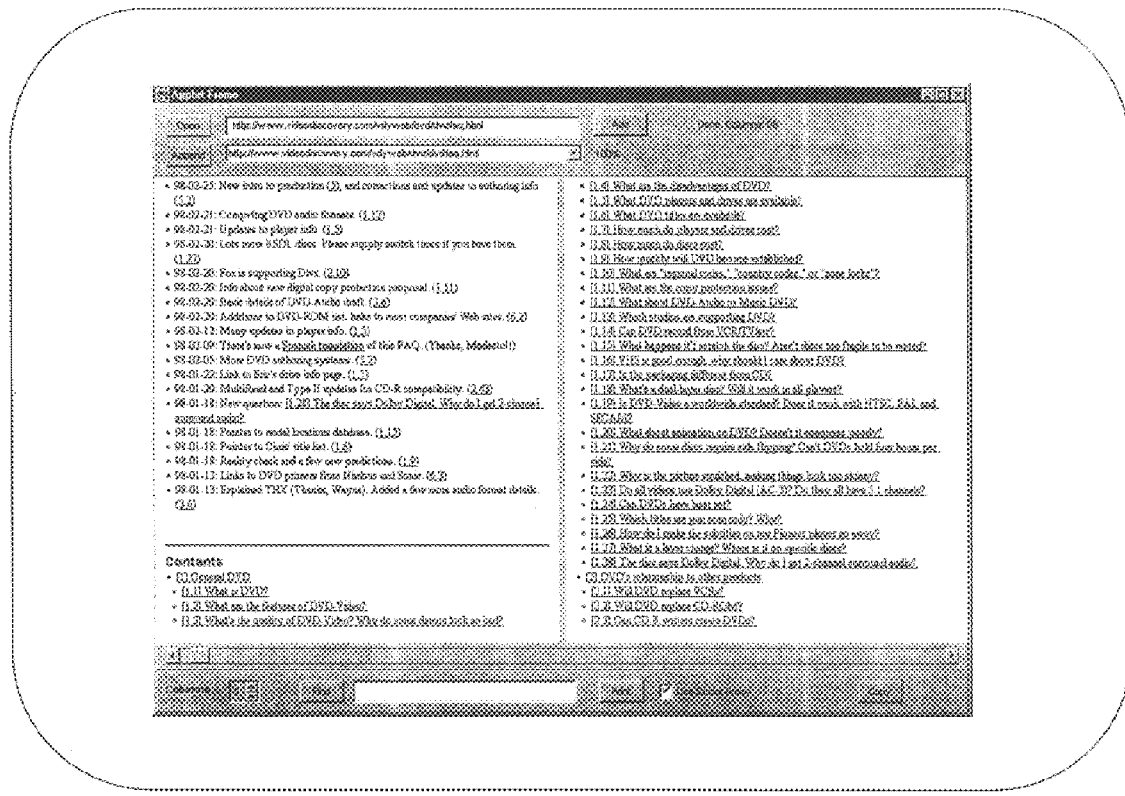

FIG. 2A illustrates an example of the convenient, newspaper-like, multi-column format of a document performed by the optimized viewer 108. The normal format for displaying such a document would be a single column the width of the window or frame, thereby requiring the user to scroll within the window to display most or all of the contents of the right-side column. Using the optimized viewer 108, however, a document displayed in multiple columns can be scrolled by whole columns. FIG. 2B illustrates the results of scrolling the document of FIG. 2A by one column, wherein the right-side column of FIG. 2A scrolls to become the left-side column of FIG. 2B and the right-side column of FIG. 2B displays additional text.

Figure 2C:
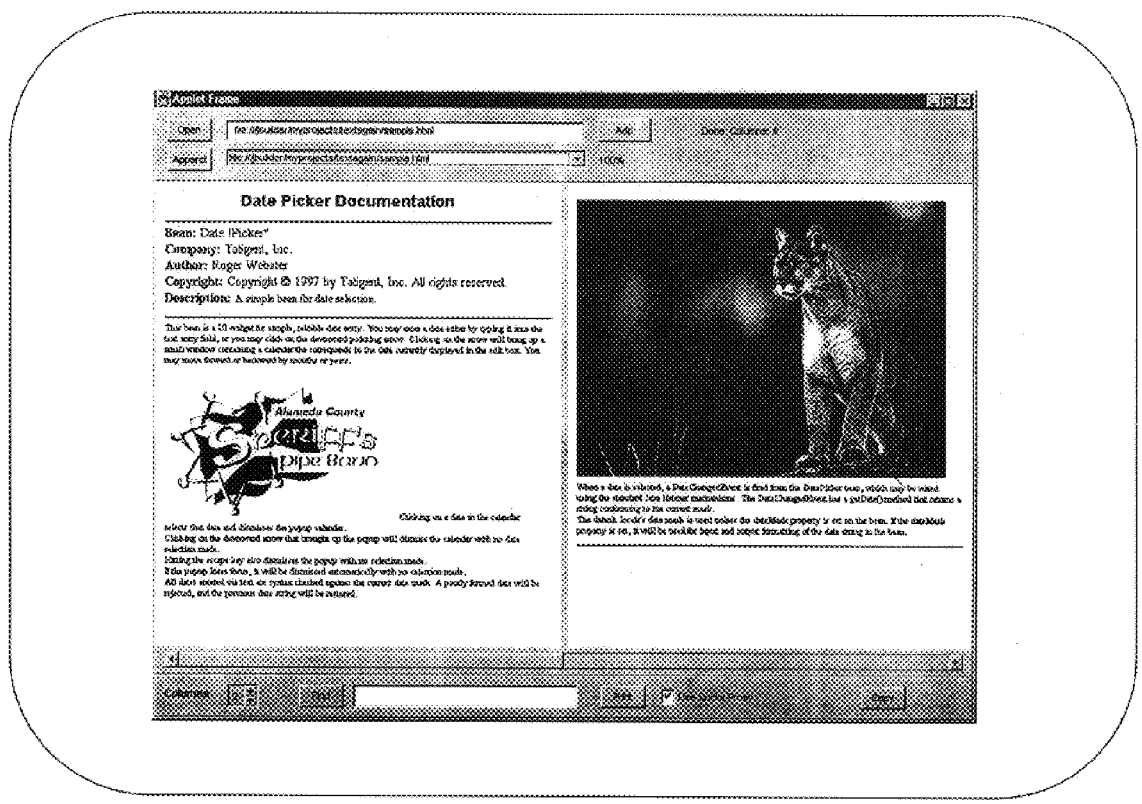
Figure 2D:
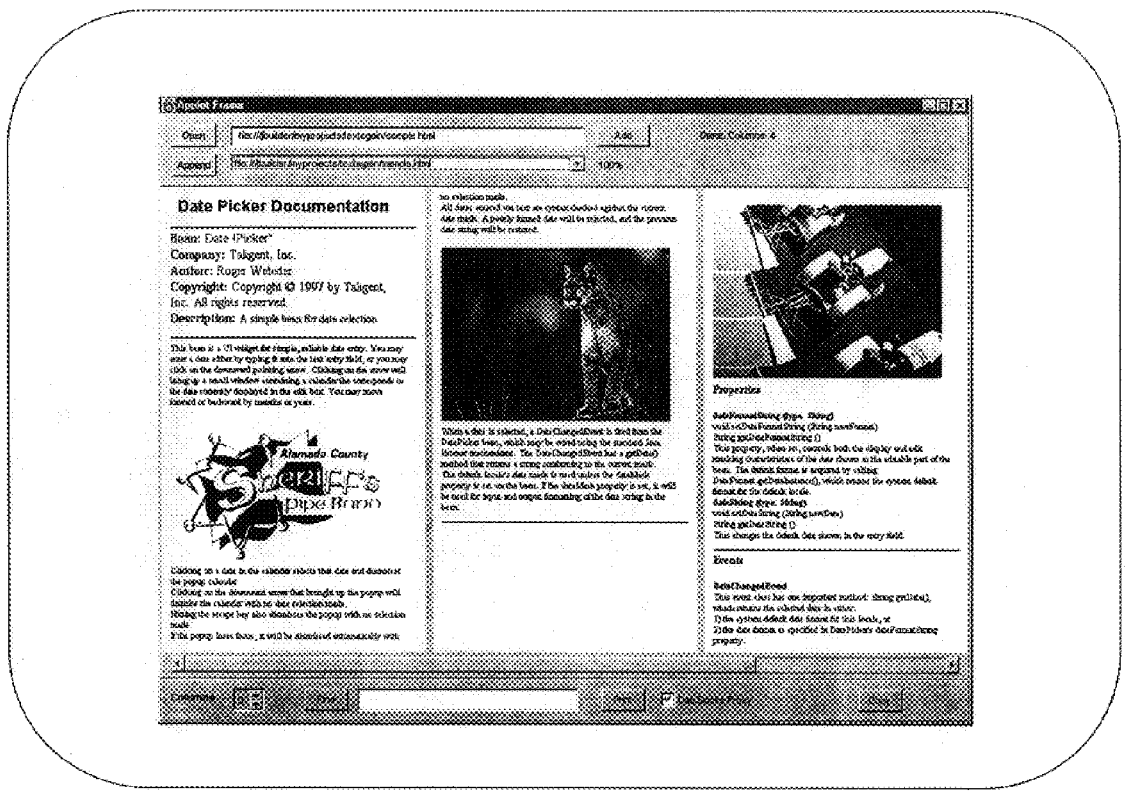

FIG. 2C illustrates an example of the convenient, newspaper-like, multi-column format of a document performed by the optimized viewer 108, wherein images in the document have been automatically scaled to fit the displayed columns. Currently, web browsers display images in documents in an unscaled manner. To facilitate a copyfitting function (making text flow into multiple columns), the optimized viewer 108 scales images in documents as needed to produce a nicely formatted document. In this example, the "animal" image at the top of the second column is actually 1024 by 768 pixels, but was scaled to fit into the space allowed by the width of the columns. FIG. 2D illustrates an example where the document of FIG. 2C is displayed in three columns and the images in the document are automatically scaled to fit the displayed columns.

Figure 2E:
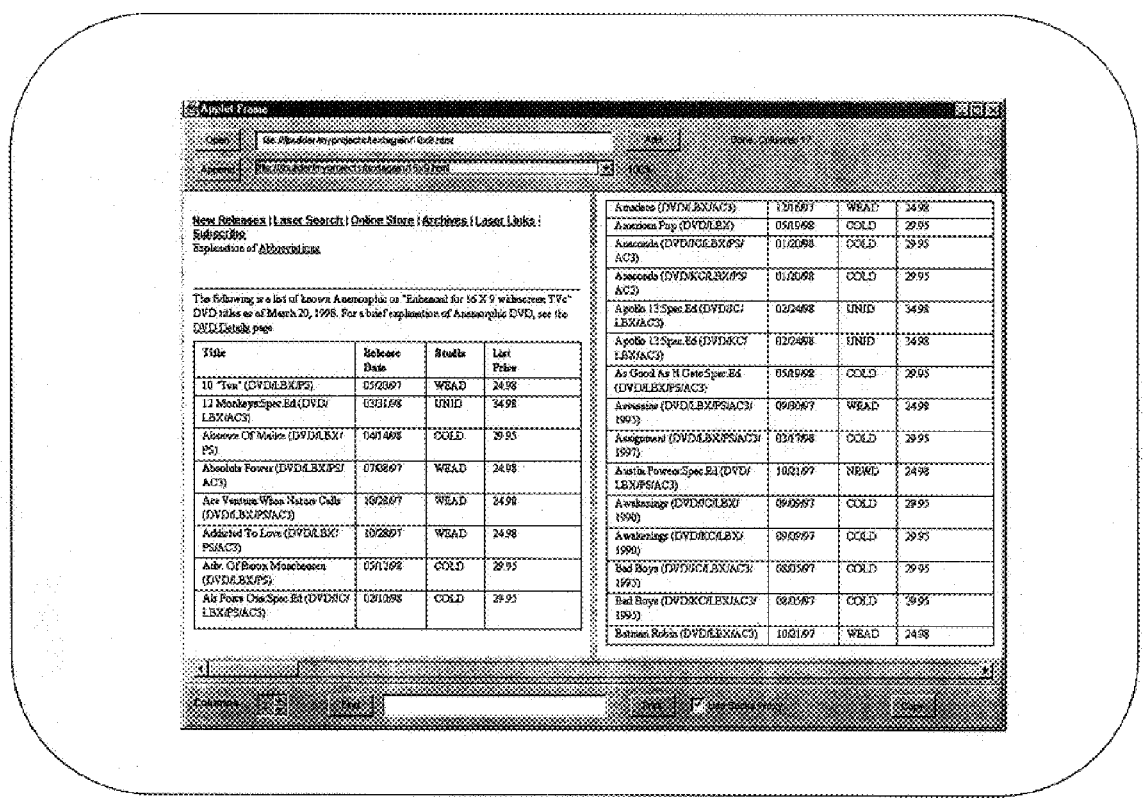

FIG. 2E illustrates an example of the convenient, newspaper-like, multi-column format of a document performed by the optimized viewer 108, wherein the document includes a table spanning multiple columns. Normally, tables in an HTML document are rendered in a manner without regard to their height, which leads to very strange looking documents, especially when printing the documents. The optimized viewer 108, on the other hand, intelligently break tables across multiple columns (at row boundaries), resulting in a nicer on-screen presentation, and a much nicer result when printed.

Figure 2F:
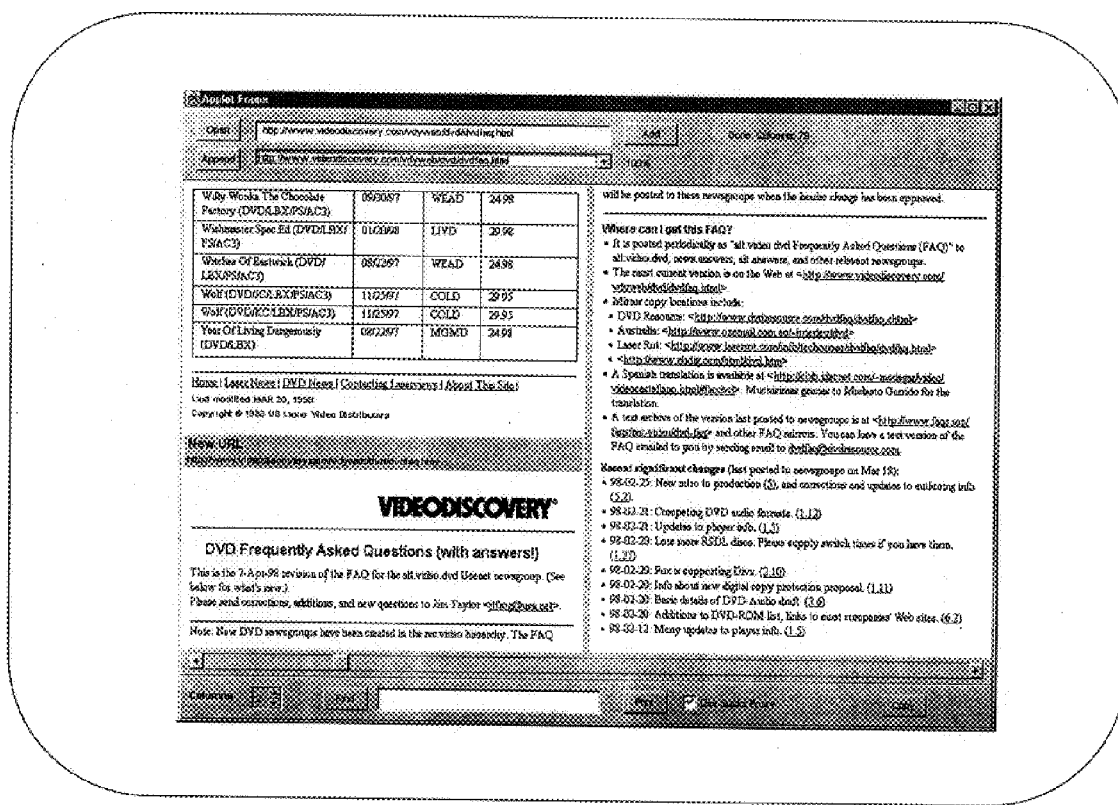

FIG. 2F illustrates an example of the convenient, newspaper-like, multi-column format created by the optimized viewer 108, wherein multiple HTML documents are displayed simultaneously. Currently, the display of a new document or retrieval of a new URL (Uniform Resource Locator) results in the replacement of the currently displayed document, In this example, however, the document of FIG. 2A is appended to the document of FIG. 2E by the optimized viewer 108, wherein the grayed horizontal bar in the left-side column labeled as "New URL" provides a demarcation point between the two documents.

Note that, unlike current browsers, the choice of appending text or documents to a currently displayed document or of replacing the currently displayed document is under user control in the optimized viewer 108. Also, the user need not wait for a document to complete the loading and formatting functions before it is displayed, as the optimized viewer 108 can load, format, and display documents simultaneously, either serially or in increments, for enhanced performance. This allows, for example, documents to be loaded and formatted in the background by the optimized viewer 108 while the user is reading previously displayed documents.

Logic of the Optimized Viewer

Figure 3:
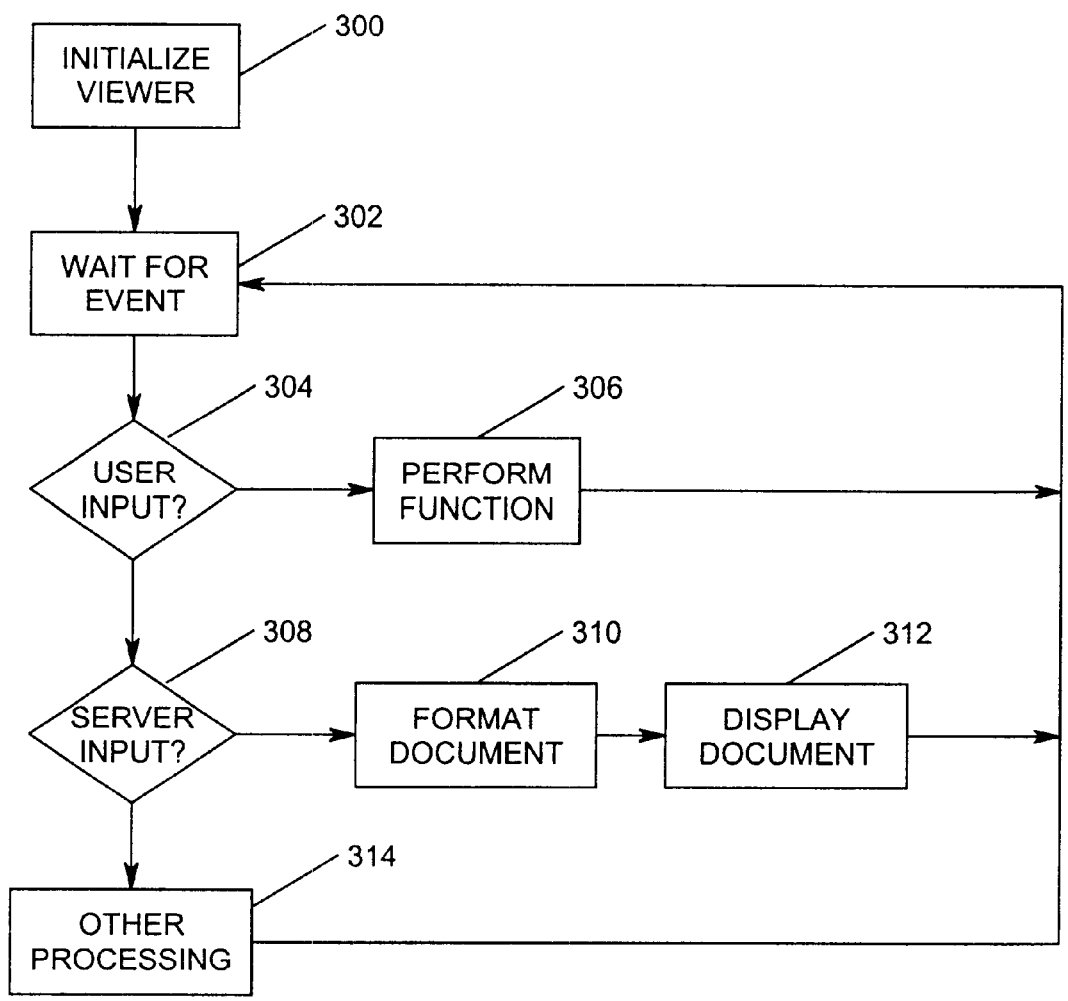
FIG. 3 is a flowchart that illustrates the logic performed by the optimized viewer according to the present invention.

FIG. 3 is a flowchart that generally describes the steps performed by the optimized viewer 108 according to the present invention.

Block 300 represents the initialization of the optimized viewer 108.

Block 302 represents the optimized viewer 108 waiting for the next event to occur, such as the receipt of input from the user or the server computer 104.

Block 304 is a decision block that represents the optimized viewer 108 determining whether the received input was from the user. If so, control transfers to Block 306; otherwise, control transfers to Block 308.

Block 306 represents the optimized viewer 108 performing the functions associated with the user input, such as configuring the operation of the optimized server 108 or transmitting requests to the server computer 104. For example, one function may be the specification of various formatting styles for the documents, including the number of columns, whether to append multiple documents, etc. In another example, one function may be to scroll the displayed document by columns.

Block 308 is a decision block that represents the optimized viewer 108 determining whether the received input was from the server computer 108. If so, control transfers to Block 310; otherwise, control transfers to Block 314.

Block 310 represents the optimized viewer 108 formatting the input, i.e., document, received from the server computer 104 into a convenient, newspaper-like, multi-column format and Block 312 represents the optimized viewer 108 displaying the formatted document. As described above, a number of different formatting options may be included in this function. One option is to append a new document to a currently displayed document, so that multiple documents may be displayed on the monitor simultaneously, wherein a demarcation point may be included between the currently displayed document and the appended new document. Another option may include scaling images in the displayed document to fit the displayed columns. Yet another option may include intelligently breaking tables in the displayed document at row boundaries across multiple columns to fit the displayed columns.

Block 314 represents the optimized viewer 108 performing other processing.

Conclusion

This concludes the description of the preferred embodiment of the invention. The following describe some alternative methods of accomplishing the same objects. For example, any number of different programs, other than viewers or web browsers, could benefit from the present invention. Further, standards or protocols other than HTML, such as XML, VRML, etc., could be used with the present invention.

In summary, an optimized HTML viewer has been described which formats documents and other information into a convenient, newspaper-like, multi-column format. The optimized HTML viewer also supports viewing one or many documents simultaneously, wherein the user has the option to append the new document to the end of the currently displayed document. A document displayed by the viewer in multiple columns can be scrolled by whole columns. Images in documents are scaled as necessary, and tables are intelligently broken across multiple columns at row boundaries.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for displaying a document on a computer, comprising:
   (a) obtaining a first document and a second document from a server across a network into a browser program on the computer, wherein:
      (i) a formatting for the first document and second document is defined by a markup language; and
      (ii) the first and second documents are formatted for a single column display;
   (b) the browser program re-formatting the first document into a newspaper-like, multi-column format, wherein the first document is continuous across multiple columns;
   (c) displaying the first re-formatted document on a monitor attached to the computer;
   (d) the browser program re-formatting the second document into a newspaper-like, multi-column format, wherein the second document is continuous across multiple columns, and wherein the reformatting of the second document is performed in the background simultaneously with displaying the first document; and
   (e) displaying the second re-formatted document on the monitor.

2. The method of claim 1 above, wherein the markup language comprises a HyperText Markup Language.

3. The method of claim 1 above, further comprising displaying the first document and the second document on the monitor simultaneously.

4. The method of claim 3 above, further comprising appending the second document to the first displayed document resulting in a single displayed document.

5. The method of claim 4 above, further comprising displaying a demarcation point between the first displayed document and the appended second document.

6. The method of claim 1 above, further comprising scrolling the first and second displayed documents by whole columns.

7. The method of claim 1 above, further comprising scaling images in the first and second displayed documents to fit into displayed columns.

8. The method of claim 1 above, further comprising intelligently breaking tables in the first and second displayed documents to fit into displayed columns.

9. The method of claim 1 above, wherein the table is broken at row boundaries across a plurality of displayed columns.

10. An apparatus for displaying a document on a computer, comprising a client computer coupled to a server computer across a network, the client computer comprising:
    (a) means for obtaining a first document and a second document from the server into a browser program on the computer, wherein:
       (i) a formatting for the first document and the second document is defined by a markup language; and
       (ii) the first document and the second document are formatted for a single column display;
    (b) means in the browser program for re-formatting the first document into a newspaper-like, multi-column format, wherein the first document is continuous across multiple columns;
    (c) means for displaying the re-formatted first document on a monitor attached to the computer;
    (d) means in the browser program for re-formatting the second document into a newspaper-like, multi-column format, wherein the second document is continuous across multiple columns, and wherein the reformatting of the second document is performed in the background simultaneously with displaying the first document; and
    (e) means for displaying the second re-formatted document on the monitor.

11. An article of manufacture comprising a computer program carrier readable by a computer and embodying one or more instructions executable by the computer to perform method steps for displaying a document on the computer, the method comprising:
    (a) obtaining a first document and a second document from a server across a network into a browser program on the computer, wherein:
       (i) a formatting for the first document and the second document is defined by a markup language; and
       (ii) the first document and the second document are formatted for a single column display;
    (b) the browser program re-formatting the first document into a newspaper-like, multi-column format, wherein the first document is continuous across multiple columns;
    (c) displaying the re-formatted first document on a monitor attached to the computer
    (d) the browser program re-formatting the second document into a newspaper-like, multi-column format, wherein the second document is continuous across multiple columns, and wherein the reformatting of the second document is performed in the background simultaneously with displaying the first document; and
    (e) displaying the second re-formatted document on the monitor.

12. The apparatus of claim 10 above, wherein the markup language comprises a HyperText Markup Language.

13. The apparatus of claim 10 above, the client computer further comprising means for displaying the first document and the second document on the monitor simultaneously.

14. The apparatus of claim 13 above, the client computer further comprising means for appending the second document to the first displayed document resulting in a single displayed document.

15. The apparatus of claim 14 above, the client computer further comprising means for displaying a demarcation point between the first displayed document and the appended second document.

16. The apparatus of claim 10 above, the client computer further comprising means for scrolling the first and second displayed documents by whole columns.

17. The apparatus of claim 10 above, the client computer further comprising means for scaling images in the first and second displayed documents to fit into displayed columns.

18. The apparatus of claim 10 above, the client computer further comprising means for intelligently breaking tables in the first and second displayed documents to fit into displayed columns.

19. The apparatus of claim 10 above, wherein the table is broken at row boundaries across a plurality of displayed columns.

20. The article of manufacture of claim 11 above, wherein the markup language comprises a HyperText Markup Language.

21. The article of manufacture of claim 11 above, the method further comprising displaying the first document and the second document on the monitor simultaneously.

22. The article of manufacture of claim 21 above, the method further comprising appending the second document to the first displayed document.

23. The article of manufacture of claim 21 above, the method further comprising displaying a demarcation point between the first displayed document and the appended second document.

24. The article of manufacture of claim 11 above, the method further comprising scrolling the first and second displayed documents by whole columns.

25. The article of manufacture of claim 11 above, the method further comprising scaling images in the first and second displayed documents to fit into displayed columns.

26. The article of manufacture of claim 11 above, the method further comprising intelligently breaking tables in the first and second displayed documents to fit into displayed columns.

27. The article of manufacture of claim 11 above, wherein the table is broken at row boundaries across a plurality of displayed columns.

28. The method of claim 1 wherein the first obtained document and the second obtained document are portions of a single document.

29. The apparatus of claim 10 wherein the first obtained document and the second obtained document are portions of a single document.

30. The article of manufacture of claim 11 wherein the first obtained document and the second obtained document are portions of a single document.

* * * * *